Patented Nov. 4, 1952

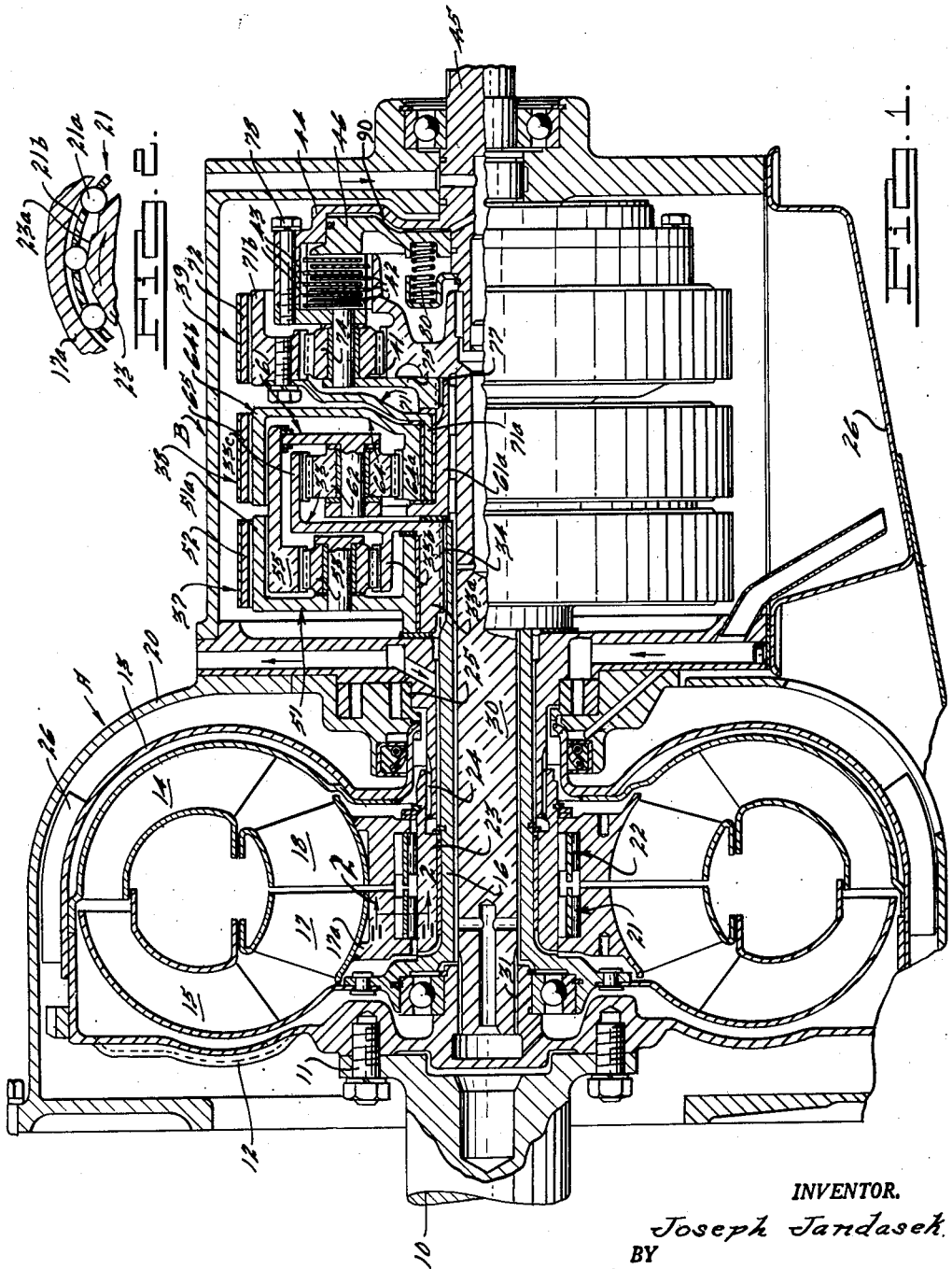

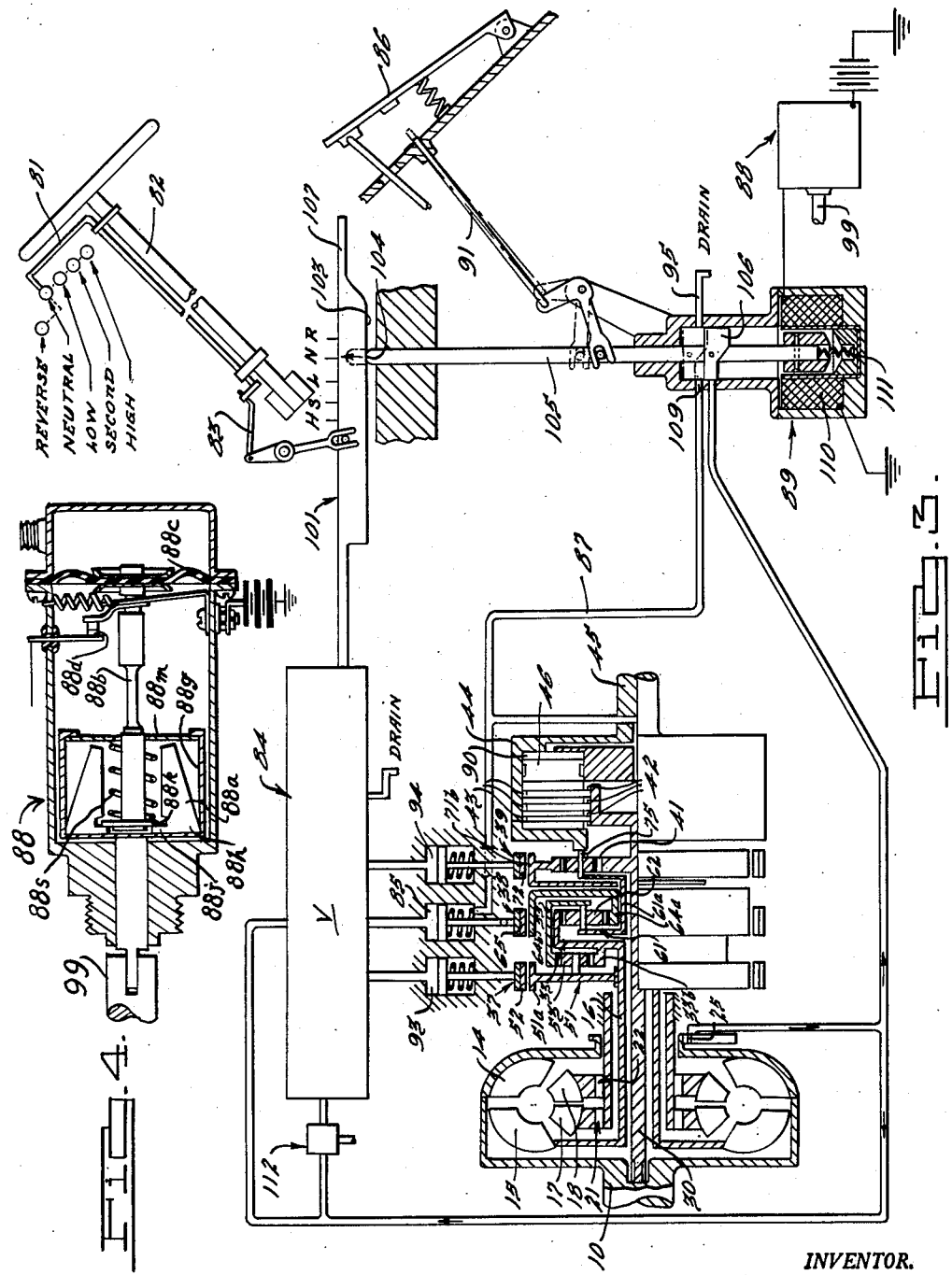

2,616,310

UNITED STATES PATENT OFFICE 2,616,310

HYDRODYNAMIC TRANSMISSION

Joseph Jandasek, Highland Park, Mich., assignor to Chrysler Corporation, Highland Park, Mich., a corporation of Delaware Application February 27, 1948, Serial No. 11,712

19 Claims. (Cl. 74—688)

This invention relates to hydrodynamic transmissions and refers more particularly to improvements in variable speed ratio drives for use in driving motor vehicles. While particularly adapted for motor vehicle drive, still, this invention is equally applicable wherever it is desirable to vary the speed ratio drive between the driving and driven elements of any mechanism or machine.

It is an object of this invention to provide a combined hydraulic and mechanical transmission which is automatic in operation, simple in design, and one which provides adequate variation in speed ratio drive to satisfactorily drive the current conventional motor vehicle.

More particularly my invention has to do with improvements in torque converter drives and has among its objects the provision of an improved and simplified transmission comprising a torque converter and associated mechanical gearing so constructed and arranged as to automatically vary the speed ratio drive between the prime mover and the driven elements, the variations in speed ratio drive occurring without manual operation of a clutch pedal or any other speed ratio control means except the drive selector lever.

It is a further object of this invention to provide a combined torque converter and variable speed mechanical transmission wherein means are provided to directly connect the driving engine to the driven output shaft so as to by-pass the torque converter and provide a slipless means for transmitting direct drive and for providing improved engine braking when operating at cruising speeds.

It is a further object of this invention to provide a gear type transmission unit, for use in conjunction with a torque converter, which incorporates an accelerating, high torque multiplication underdrive ratio adapted to be automatically brought into operation during normal starting drive, as well as when the vehicle speed in cruising direct drive decreases to a specified value, or to be manually activated by the vehicle operator when increased acceleration, at the higher cruising speeds, is desired.

It is a further object of this invention to provide a hydrodynamic transmission having means for connecting the driving engine to the driven output shaft, through mechanical speed reduction gearing only, to thereby provide a positive underdrive ratio that can serve as a coasting ratio as well as an emergency underdrive, this drive by-passing the torque converter and eliminating the possibility of slip between the converter elements.

It is a further object of this invention to provide a hydrodynamic transmission with means supplying a combination fluid and mechanical high torque multiplication underdrive for initial acceleration and means for accomplishing an automatic upshift therefrom into a positive, direct drive for normal cruising speeds.

It is a further object of this invention to provide a hydrodynamic transmission of simple design which includes a combination fluid and mechanical high torque multiplication underdrive, a positive mechanical underdrive adapted for use as an emergency underdrive and as a coasting ratio, a positive direct drive, automatically convertible into and out of the high torque multiplying underdrive, and a reverse drive.

It is a further object of this invention to provide a hydrodynamic transmission with a simplified, highly flexible control system that does not require a manually operated friction clutch or the like.

Fig. 1 is a sectional elevational view showing my power transmission which embodies a torque converter in combination with a planetary gear type change speed unit;

Fig. 2 is a fragmentary sectional elevational view taken along the line 2—2 of Fig. 1 disclosing the type of one-way brake construction used between the converter guide wheels and the transmission housing; and Fig. 3 is a diagrammatic view of the transmission and a control system therefore, the transmission being shown in neutral condition.

Fig. 4 is a sectional elevation of the speed and torque responsive control associated with the automatic control valve shown in Fig. 3.

The drawings disclose a hydrodynamic transmission which is mounted in a housing 20 and comprises a torque converter unit A and a mechanical change speed unit B. The reference numeral 10 represents an end portion of a power driven shaft, such as, the engine crankshaft of a motor vehicle, this shaft 10 being connected at 11 to the flywheel 12. The flywheel 12 carries the torque converter casing 13 within which are mounted the converter components, namely, the impeller member 14, the turbine member 15, and the primary and secondary guide members or reaction wheels 17 and 18 respectively. The vaned impeller member 14 is fixedly connected to the converter casing 13 and is accordingly rotatably driven by the driving shaft 10. The vaned turbine member 15 is drivingly connected to the forward end portion of a hollow shaft member 16 which shaft member is journalled on the intermediate shaft 30, subsequently described in detail. The converter primary and secondary guide wheels 17 and 18 are connected to the transmission housing 20 through freewheeling or one-way brakes 21 and 22 respectively.

As clearly shown in Fig. 2, the one-way brake construction 21 comprises rollers 21a mounted within a cage member 21b. The cage member 21b is normally urged into drive transmitting position by means of a tension spring (not shown). Cam surfaces 23a formed on the peripheral surface of the housing sleeve member 23 cooperate with the brake rollers 21a and guide wheel hub portion 17a to permit one-way rotation of the guide wheel 17. The sleeve member 23 is splined to the transmission housing at 24. The one-way brake connections between the guide wheels 17 and 18 and transmission housing 20 permit the guide wheels to be rotated forwardly by the impeller 14 but prevent rotation of the guide wheels in a reverse rotational direction. The guide wheels 17 and 18, connected to the transmission housing 20 through the one-way brake connections, provide the reaction means for the converter unit. By using a plurality of guide wheels, connected to the transmission housing through separate one-way brakes, the efficiency of the converter unit is improved, this feature being clearly explained in the patent to A. Coates, No. 1,760,480, dated May 27, 1930.

A gear type oil pump 25 is directly connected to, and driven by, the rotatable converter casing 13. This pump 25 draws oil from the sump in oil pan 26 and circulates it through the converter unit. This pump also provides pressure fluid for lubricating purposes as well as for the various hydraulically operated control mechanisms associated with this transmission. The circulation of the converter oil by means of pump 25 provides a means for maintaining the converter full of oil whenever the engine is running, and, furthermore, this circulation of oil provides a means for cooling the converter fluid. To further assist in the cooling of the converter oil, fins 26 are provided on the exterior surface of the converter casing 13 so as to circulate air about the converter casing and thereby reduce the temperature of the oil within the casing.

The intermediate shaft 30 has its forward end portion supported by and connected to the crankshaft 10, the splined connection between these members being indicated by the numeral 31. The rear end portion of shaft 30 encircles and is journalled on the forward end portion of the driven output shaft 45. Rotatably mounted on the rear portion of intermediate shaft 30 are three planetary gear trains indicated by the numerals 37, 38 and 39 respectively. The forward gear train 37 provides means for obtaining reverse drive through the transmission. The intermediate gear train 38 provides means for obtaining a starting forward underdrive through the transmission and also provides a means for obtaining a kickdown from the cruising direct drive to an accelerating underdrive ratio. The rear gear train 39 provides a coasting gear ratio for braking purposes as well as a means for obtaining an emergency forward low gear drive through the transmission.

The rear end portion of intermediate shaft 30 is formed with gear teeth 41 which constitute the sun gear element of the rear planetary gear train 39. Also mounted on the rear end portion of intermediate shaft 30 are friction clutch elements 42 which are adapted to be engaged with cooperating clutch elements 43 carried by the drum shape extension 44 of the output shaft 45. Engagement of clutch elements 42 and 43 is effected through a hydraulically actuated piston member 46. When clutch elements 42 and 43 are engaged drive is transmitted directly from the engine crankshaft 10 through intermediate shaft 30, clutch elements 42 and 43, drum member 44 and thence to the output shaft 45. When the engine is connected to the output shaft 45 through this drive train, the transmission is conditioned for the cruising direct drive and slipless engine braking is available for this drive train by-passes the torque converter unit A and the planetary gear trains of the change speed unit B.

Planetary gear train 37, which provides for reverse drive, includes planet carrier 51 which is journalled on the hub portion 33a of annular member 33. Carrier 51 has an axially extending peripheral drum portion 51a adapted to be engaged by the braking band 52. Rotatably mounted on carrier 51 are a plurality of planet pinions 53. The teeth of pinions 53 mesh with the external teeth on the forwardly projecting ring portion 33b of annular member 33. The annular member 33 has its hub portion 33a drivingly connected by splines 34 to the rearwardly projecting end portion of the turbine driven hollow shaft 16. The toothed portion 33b of annular member 33 constitutes the sun gear of the forward planetary gear train. The teeth of pinion 53 are also in meshing engagement with the internal teeth on drum member 55. Drum member 55 constitutes the annulus gear of the forwardly disposed planetary gear train 37. The drum member 55, while forming a part of the forwardly disposed planetary gear train 37 is supported by and forms a part of the planet carrier 61 of the intermediate planetary gear train 38.

Planetary gear train 38, which provides for normal starting forward drive, includes the planet carrier 61 which is rotatably supported on the intermediate shaft 30 by means of hub portion 61a. Planet pinions 62, rotatably mounted on carrier 61, have teeth meshingly engaged with internal teeth on the rearwardly projecting portion 33c of annular member 33. This internally toothed portion 33c of member 33 forms the annulus gear of the intermediately disposed planetary gear train 38. The teeth of pinions 62 also engage external teeth on the hub portion 64a of the rotatably supported drum member 64. Drum member 64 is rotatably supported on hub portion 71a of annulus member 71. The toothed hub portion 64a of drum 64 constitutes the sun gear of the intermediate planetary 38. Drum 64 has an axially extending peripheral flange 64b adapted to be engaged by the braking band 65.

Rear planetary gear train 39, which provides an emergency forward drive ratio, includes the annulus member 71 which is rotatably supported by hub portion 71a on the hub portion 61a of planet carrier 61. Annulus member 71 has an axially extending peripheral flange portion 71b adapted to be engaged by a braking band 72. Flange portion 71b carries internal teeth adapted to mesh with the teeth of planet pinions 74. The teeth of planet pinions 74 are also in meshing engagement with the sun gear teeth 41 formed on the rear end portion of intermediate shaft 30. Planet pinions 74 are rotatably mounted on the planet carrier 75 which is supported by and connected to the hub portion 61a of planet carrier 61 by means of the spline connection 77. Planet carrier 75 is connected by bolts 78 to the drum-shaped extension 44 of output shaft 45.

The hydraulically actuated piston 46, which is adapted to effect engagement of the direct drive friction clutch plates 42 and 43, is normally held in a retracted position by means of compression springs 80. However, when the transmission is to be conditioned for the transmission of direct drive from the engine crankshaft 10 to the output shaft 45, then pressure fluid is admitted to the cylinder space 90 between the head of piston 46 and the inner wall of drum member 44 and this moves piston 46 forwardly to compress springs 80 and engage the clutch discs 42 and 43. Engagement of the direct drive friction clutch elements 42 and 43 occurs only after the planetary gear braking bands have been retracted to disengaged positions.

With the transmission conditioned for neutral the braking bands of the three planetary gear trains 37, 38 and 39 are held in disengaged positions and the direct drive clutch plates 42 and 43 are also disengaged so that drive cannot be transmitted from the engine crankshaft 10 to the output shaft 45.

Fig. 3 diagrammatically shows the power transmission unit and the control system therefor. The control system includes the drive selector lever 81 and the associated linkage 83 which controls operation of the rail member 101. Rail member 101 operates suitable valving in the valve unit 84 to control the admission of pressure fluid from pump 25 into the appropriate planetary brake band cylinders 85, 93 and 94, respectively, depending on the setting of the drive selector lever 81. Pressure fluid from pump 25 is also directed to an automatically operated control valve 89 which controls the upshifts and downshifts between the starting underdrive gear ratio through planetary 38 and the cruising direct drive through clutch plates 42, 43. Valve unit 89 includes the plunger valve 106 that is reciprocably mounted in a valve bore so as to control the admission of pressure fluid to the conduit 87. Valve 106 is normally urged to the upshifted broken line position by the compression spring 111. When in this upshifted position, pressure fluid from pump 25 can pass through valve 89 and outlet port 109 into conduit 87 which conducts the pressure fluid to the cylinder 90 of the direct drive clutch to effect engagement thereof. Pressure fluid admitted to conduit 87 from valve 89 is also directed into the underside of brake band cylinder 85 to affect disengagement of brake band 65 when the direct drive clutch is engaged. The spring in the underside of cylinder 85 assists the pressure fluid therein in overcoming the pressure fluid in the upperside of cylinder 85. Associated with valve 89 is the solenoid unit 110 that holds the valve 106 in a depressed position when the speed and torque conditions are such as to condition the transmission for drive through the starting forward underdrive gear train 38. Energization of solenoid 110 depresses valve 106 against the force exerted by compression spring 111 and closes off valve 89 so as to deactivate conduit 87. De-energization of solenoid 110 permits spring 111 to raise valve 106 so as to admit pressure fluid to conduit 87 to affect the upshift to direct drive. Control of energization of solenoid 110 is by means of the speed and torque responsive control means 88. The speed responsive governor weights 88a (see Fig. 4) of the speed and torque responsive control means 88 are rockably mounted in the cup member 88g that is drivingly connected to the rotatable shaft 99. Shaft 99 is drivingly connected to the transmission output shaft 45, by means not shown, so that shaft 99 may be driven at a rate proportional to the vehicle speed. On rotation of shaft 99 centrifugal action tends to cause the governor weights 88a to pivot outwardly about their pivot centers 88h. In pivoting outwardly about pivot points 88h, the portions 88j of the weights 88a move axially toward the right and this movement urges the collar 88k, carried by the axially shiftable rod 88b, towards the right also. Movement of the collar 88k and the rod 88b towards the right is resiliently resisted by the compression spring 88s. Spring 88s is mounted in the cup 88g so as to extend between the cup bottom 88m and the rod collar 88k. As the vehicle speed increases the rotating governor weights 88a tend to shift the rod 88b and its attached diaphragm 88c towards the right. The axially shiftable rod 88b carries one contact of an electrical switch 88d that forms part of the circuit for controlling energization of solenoid 110. The chamber on the right side of diaphragm 88c is connected to the intake manifold of the engine unit, not shown, that drives the input shaft 10 for this transmission unit. At closed throttle the speed of the shaft 99 is not sufficient to develop the centrifugal force necessary to overcome the spring 88s and move the rod 88b to the right. Furthermore, the spring 88s is of sufficient strength to prevent the manifold vacuum in the chamber on the right side of diaphragm 88c from effecting movement to the right of the rod 88b at closed throttle. Accordingly, the switch 88d remains closed at closed throttle and for a predetermined period after opening of the throttle after which the control means 88 automatically opens switch 88d and effects a speed and torque responsive upshift of the transmission. It is thought to be obvious that depression of the throttle control 86 will reduce the manifold vacuum on the right side of diaphragm 88c while at the same time there will be a tendency for the speed of shaft 99 to increase. This speed increase causes the governor weights to pivot radially outwardly so as to shift rod 88b towards the right to open switch 88d and effect the upshift to direct drive. In this manner there are speed and torque responsive components simultaneously applied to the diaphragm 88c and thus the switch 88d is opened and closed when predetermined relationships between these two components have been established. The remaining parts of this transmission control system and the operation thereof are subsequently described in detail so additional description at this point is deemed unnecessary.

Operation of this transmission is as follows:

For ordinary forward drive the drive selector lever 81 (see Fig. 3), normally mounted on the steering column 82, is moved to the position denoted as High. This causes linkage 83 to operate the control rail 101 for manual control valve 84 so as to admit pressure fluid from pump 25 to the upper portion of the intermediate planetary brake band cylinder 85 and lock brake band 65 about the drum member 64b to thereby anchor sun gear member 64a against rotation. As the engine accelerator or throttle control member 86 is depressed to speed up the engine, the speed of rotation of the impeller 14 is increased and a torque multiplying drive is transmitted through the torque converter unit to the turbine member 15 and then through the hollow shaft member 16 to the annular member 33. As member 33 rotates, the planet pinions 62 of the intermediate planetary gear train 38 are rotated about the fixed sun gear 64a and this causes planet carrier 61 to be rotated at a reduced speed torque multiplying ratio. As planet carrier 61 is drivingly connected to the planet carrier member 75 of the rear planetary train and to the output shaft drum member 44, a high torque multiplication forward underdrive is transmitted to the output shaft 45. It will be noted that this accelerating underdrive is a combination fluid and mechanical torque multiplying drive that is the product of the individual torque multiplying effects of the torque converter unit A and the intermediate planetary gear train 38.

On initial acceleration through the above described underdrive gear train, the impeller 14 is rotated in a counterclockwise direction due to similar rotation of the engine crankshaft 10. The shaping of the blades of the impeller, turbine and guide wheels of the converter unit is such as to direct the converter fluid against the blades of the guide wheels 17 and 18 in such a manner as to tend to rotate the guide wheels in a reverse or clockwise direction. Due to the one-way brakes, 21 and 22, between the guide wheels and the sleeve extension 23 of the transmission housing 20, the guide wheels are locked against reverse rotation and a reaction effect is produced which multiplies the torque transmitted by the converter unit. This torque multiplication provides the accelerating power necessary for starting drive of the vehicle or for increasing the vehicle speed from a low value to that necessary for the subsequent upshift to direct drive. During the major portion of the torque multiplication period the guide wheels are locked up in a stationary position. As vehicle speed increases and the torque demand decreases, the speeds of the impeller 14 and the runner 15 will tend to substantially attain the same value. As the speeds of these members approach the same value, the reaction forces directed against the guide wheel blades gradually disappear and the impelled fluid within the converter begins to drive the guide wheels forwardly in a counterclockwise direction. When the impeller, turbine and guide wheels are all rotating in the same direction at substantially the same speed, the converter is functioning as a simple fluid coupling and the torque multiplying period of the converter has terminated. It is at about this time that the subsequently described automatic upshift to direct drive occurs. The use of a plurality of guide wheels facilitates a gradual conversion of the torque converter into a simple fluid coupling and, furthermore, this multiple guide wheel construction increases the overall efficiency of the converter unit.

Normally, when the vehicle speed is within the range somewhere between 20 and 35 miles per hour, the torque converter will begin to function as a fluid coupling transmitting torque at substantially a one to one ratio. At about the time this condition occurs, the speed and torque responsive control means 88 opens switch 88d and de-energizes the solenoid 110 permitting spring 111 to raise valve 106 and this causes the automatic valve means 89 to open so as to direct pressure fluid from pump 25 through conduit 87 into the underside of the intermediate planetary brake band cylinder 85 to effect disengagement of the underdrive brake band 65. Opening valve 89 not only disengages underdrive brake band 65 but simultaneously admits pressure fluid to the direct drive clutch cylinder 90 and this actuates piston 46 to cause engagement of the direct drive clutch discs 42 and 43. The simultaneous engagement of clutch discs 42 and 43 and the disengagement of brake band 65 from drum 64b converts the underdrive gear train into a direct drive from the engine crankshaft 10 to the output shaft 45. Direct drive is now transmitted by the train consisting of the crankshaft 10, directly connected intermediate shaft 30, engaged clutch plates 42 and 43, drum member 44, and output shaft 45.

If while operating in direct drive, the vehicle speed is reduced to a very low value, such as 4 or 5 miles per hour, and the torque demand is increased, then the speed and torque responsive control means 88 brings about an energization of the solenoid 110 which causes a depression of plunger valve 106 to the position shown in full lines in Fig. 3 which effects a closing of the valve 89. Closing of valve 89 discontinues the supply of pressure fluid to conduit 87 and uncovers drain port 95 which drains the pressure fluid from the cylinder 90 and disengages the direct drive clutch blades 42 and 43. Closing of valve 89 also permits draining of the pressure fluid from the underside of the underdrive brake band cylinder 85 and this permits a reengagement of the underdrive controlled band 65 and the sun gear drum member 64b. As a result of this rearrangement of the drive transmitting members, occasioned by the automatic closing of valve 89, there is an automatic kick-down or downshift to the starting underdrive ratio from the direct drive ratio, this down-shift being controlled by vehicle speed and torque demand through the control means 88.

In the event it becomes necessary to kick down from the cruising direct drive to the starting underdrive ratio, prior to the time the speed and torque responsive control means 88 automatically closes valve 89 to accomplish this downshift, the vehicle operator may accomplish such a reduction in speed ratio drive by merely depressing the throttle control member 86 to its limit whereupon the linkage 91 will overrule the positioning of valve plunger 106 by the spring 111 and will depress the plunger 106 so as to close the valve 89. Closing the valve 89 drains pressure fluid from the clutch cylinder 90 and the underside of cylinder 85 which disengages the direct drive clutch elements 42 and 43 and reengages the underdrive brake band 65 and drum 64b to condition the transmission for the forward accelerating underdrive. The upshift from underdrive back to direct drive will occur in the normal manner under the control of the speed and torque responsive control means 88.

To obtain reverse drive through this transmission the drive selector lever 81 is moved to the position indicated as Reverse and this shifts control rail 101 to a position that causes valve 84 to direct pressure fluid into the brake band cylinder 93 of forwardly disposed planetary train 37 so as to lock reverse band 52 about drum 51a. It is obvious that the other control bands of the planetary gear units are in retracted, disengaged positions at this time. Engagement of band 52 and drum 51a locks planet carrier 51 against rotation, and as the throttle control member 86 is subsequently depressed, a forward drive is transmitted from the converter turbine member 15 through shaft member 16 to annular member 33. Rotation of member 33 forwardly rotatably drives the sun gear portion 33b of the forward planetary unit 37 forwardly and this rotates planet pinions 53 reversely. Rotation of planet pinions 53 reversely on fixed planet carrier 51 causes a reverse drive to be transmitted to the annulus drum member 55. Drum member 55 is connected to the intermediate planet carrier member 61 which in turn is connected to the rear planetary carrier member 75 and the output drum member 44. Accordingly, reverse drive will be transmitted through this gear train when the reverse braking band 52 is locked about the annulus drum 51a.

The rearwardly disposed planetary gear train 39 provides an emergency low gear as well as a coasting gear adapted for engine braking purposes. To obtain drive through this gear it is merely necessary to move the control lever 81 to the position indicated as Low and this causes subsequently valve 84 to admit pressure fluid to the rear planetary brake band cylinder 94 so as to lock brake band 72 about the drum member 71b of annulus gear 71. As the throttle control member 86 is depressed to increase the engine speed, the intermediate shaft 30, which is directly connected to the engine, rotatably drives the sun gear member 41. Due to annulus gear 71 being held by band 72 the rotation of sun gear 41 causes rotation of pinion gears 74 about the fixed annulus gear 71 and this drives the planet carrier 75 forwardly at a reduced speed ratio. As carrier member 75 is directly connected to the output shaft 45, through drum member 44, the vehicle will be driven in a forward low gear ratio. It will be noted that when drive is being transmitted through the emergency low and coasting gear train 39 that the torque converter unit A is being by-passed due to the drive being transmitted directly from crankshaft 10 through intermediate shaft 30 and the gear train 39 to output shaft 45. This drive eliminates any slip which might be developed when drive is being transmitted through the converter unit and provides a positive low speed drive as well as a coasting brake that will utilize the maximum engine braking effect. This positive drive is also of considerable benefit when it is necessary to start the vehicle by towing.

The drive selector lever linkage 83 includes the slidable control rail member 101 which is adapted to operate the manual control valve 84 and to also provide cam means 103 to override the automatic control valve 89 and thereby prevent undesired automatic shifts by the torque and speed responsive control means 88. Rail member 101 includes a cam portion 103 adapted to be engaged by the follower end 104 of the automatic control valve stem 105. As drive selector lever 81 is moved to the various control positions the rail 101 is reciprocated and this causes reciprocatory movement of the control valve stem 105 so as to properly locate the control valve plunger 106 for the selected speed ratio drive. In all positions of the drive selector lever 81, except High, the control valve plunger 106 will be cammed downwardly so as to close off the pressure fluid supply to valve 89 and open port 95 to drain the direct clutch cylinder 90 as well as the underside of the intermediate brake band cylinder 85. Obviously this prevents an automatic upshift to direct drive at all times except when the selector lever has been moved to the High position. By the cam mechanism 103 and 104 it is possible to set the selector lever 81 in Second position and prevent an automatic upshift to direct drive by the governor means 88. When the drive selector 81 is placed in High position the portion 107 of the rail 101 is positioned in contact with the valve stem follower 104 and this permits the valve plunger 106 to be automatically raised to the uppermost open valve position when the control means 88 brings about the upshift to direct drive. The upshifted direct drive position of valve plunger 106 is indicated by the dashed lines in Fig. 3. When the valve plunger 106 is positioned in the uppermost position then the outlet 109 to the conduit 87 is uncovered and the drain port 95 is closed so pressure fluid is directed to the direct clutch 90 and to the underside of the underdrive braking cylinder 85. While the cam mechanism 103—104 may be positioned so as to allow spring 111 to position the plunger valve 106 in raised, open valve position, still, at low vehicle speeds the control means 88, through the energized solenoid 110, retracts the plunger 106 and holds it in the closed valve position where it blocks off the supply of pressure fluid to conduit 87. When vehicle speed and torque demand are such that the upshift to direct drive is in order, then control means 88 causes a deenergization of the solenoid 110 and the compressed spring 111 then forces the plunger valve 106 to the raised open valve position so as to direct pressure fluid into the conduit 87.

When operating in direct drive, with plunger valve 106 in the raised, open valve position, it is obvious that a depression of the foot throttle control member 86 to its lower limit will cause linkage 91 to move the valve member 106 to closed valve position and thus overrule the governor control means 88. Valve plunger 106 may be moved to closed valve position even though solenoid 110 is deenergized for the spring 111 is merely compressed by the downward movement of the valve plunger assembly 104—106.

A speed responsive control means 112 is provided to cause actuation of valve 84 so as to direct pressure fluid into the top of control cylinder 85 instead of into control cylinder 94 in order to automatically shift the transmission of drive from the emergency low gear train 39 to the starting underdrive gear train 38 when the drive selector lever 81 is set for low gear drive and the vehicle speed drops below a minimum speed of approximately 2 or 3 miles per hour. The control means 112 may be any sort of speed responsive governor unit driven by the output shaft 45 and arranged to shift suitable valving in control valve unit 84 so that at low speeds, with the drive selector lever set for low, pressure fluid from pump 25 will be directed into underdrive brake band cylinder 85 instead of low brake band cylinder 94. As the speed increases then the speed responsive means 112 transfers the pressure fluid to cylinder 94 from cylinder 85. This speed controlled shift from low gear to starting underdrive prevents stall of the engine at low vehicle speeds for the direct connection between the engine and output shaft in emergency low gear is replaced with a drive through the underdrive gear train and the torque converter which latter drive permits slip at low vehicle speeds as well as when the vehicle has been brought to rest. Also, when the vehicle is to be started through the emergency low gear train 39 the control means 112 initiates this start through the torque converter and the underdrive gear train 38 and then shifts the drive train to the low gear train 39 after the vehicle is set in motion. This prevents a jerky start and assures a start through the fluid converter unit in all starting gear ratios. When the vehicle is brought to a stop with the drive selector lever set for either high or low drive the transmission is automatically shifted into the underdrive gear ratio and the slip of the torque converter unit at engine idling speed prevents creep of the vehicle.

I claim:

1. In a power transmission, an input shaft, a torque converter unit comprising an impeller member, a turbine member and a reaction member cooperatively arranged to form a torque multiplying power transmitting device, means connecting said input shaft to said impeller member, a hollow intermediate shaft connected to and driven by said turbine member, an extension of said input shaft extending concentrically through said hollow intermediate shaft, a first forward drive planetary gear train having the annulus gear thereof mounted on and adapted to be driven by said turbine driven shaft to provide means for the transmission of a fluid and mechanical torque multiplying, accelerating, forward underdrive, a second forward drive planetary gear train having the sun gear thereof mounted on and adapted to be driven by the extension of said input shaft to provide means for the transmission of a positively connected emergency, forward underdrive that is also useable as a coasting ratio, an output shaft, means for drivingly connecting each of said planetary gear trains to said output shaft upon selective activation of the gear trains, brake means for selectively activating said planetary gear trains, and an output shaft speed responsive governor to automatically deactivate the second gear train and activate the first gear train to change the emergency underdrive to the accelerating underdrive when the transmission is conditioned for the transmission of the emergency underdrive and the output shaft speed is reduced to a predetermined value.

2. In a power transmission, an input shaft, an output shaft, a torque converter unit and a variable speed gear unit operatively connected in series between said shafts, said gear unit including a first and a second planetary gear set, said first gear set having the annulus gear thereof driven by the converter and arranged to provide for the transmission of a combination converter and gear unit generated torque multiplying forward underdrive from said input to said output shaft, an intermediate shaft drivingly connected to said input shaft, said second gear set having the sun gear thereof mounted on and driven by said intermediate shaft to provide a mechanical underdrive, clutch means to drivingly connect said input and output shafts to provide for the transmission of direct drive between said shafts, output shaft speed and torque responsive control means to simultaneously control the first gear set and the clutch to provide means to automatically upshift said underdrive to direct drive and to automatically downshift said direct drive to said underdrive, and output shaft speed responsive means to control activation of the gear sets to provide for an automatic change in speed ratio drive from said mechanical underdrive to said combination torque multiplying underdrive when the transmission is conditioned for the mechanical underdrive and the output shaft speed is reduced to a predetermined value.

3. In a power transmission, an input shaft, an output shaft, a torque converter unit and a variable speed gear unit operatively connected in series between said shafts, said gear unit including a first and a second planetary gear set, said first gear set having the annulus gear thereof driven by the converter and arranged to provide for the transmission of a combination converter and gear unit generated torque multiplying underdrive from said input to said output shaft, an intermediate shaft drivingly connected to said input shaft, said second gear set having the sun gear thereof mounted on and driven by said intermediate shaft to provide a mechanical underdrive, clutch means to directly connect said input and output shafts to provide for the transmission of direct drive between said shafts, output shaft speed and torque responsive control means to operate the first gear set and the clutch to provide means to automatically upshift said underdrive to direct drive and to automatically downshift said direct drive to said underdrive, manually operated means to overrule said automatically operable speed and torque responsive control means to accomplish a downshift from direct drive to the torque multiplying underdrive, and output shaft speed responsive means to control activation of the gear sets to provide for an automatic change in speed ratio drive from said mechanical underdrive to said combination torque multiplying underdrive when the transmission is conditioned for the mechanical underdrive and the output shaft speed is reduced to a predetermined value.

4. A transmission for connecting a driving shaft to a driven shaft comprising a hydraulic torque transmitting device having impeller and turbine members, means connecting the driving shaft to the impeller member, an intermediate shaft drivingly connected to the turbine member and having drivingly connected thereto a sun gear of a first planetary gear train and an annulus gear of a second planetary gear train, annulus and pinion gears drivingly connected with the sun gear of the first gear train, a carrier for the pinion gears of the first gear train, sun and pinion gears drivingly connected with the annulus gear of the second gear train, a carrier for the pinion gears of the second gear train, means drivingly connecting the annulus gear of the first gear train to the pinion gear carrier of the second gear train, an extension on said driving shaft concentrically arranged with respect to said intermediate shaft and having drivingly connected thereto a sun gear of a third planetary gear train, annulus and pinion gears drivingly connected with the sun gear of the third gear train, a carrier for the pinion gears of the third gear train, means drivingly connecting the carrier of the third gear train to the carrier of the second gear train and to the driven shaft, braking means to selectively activate each of the gear trains, and clutch means to directly drivingly connect the extension of the driving shaft to the driven shaft.

5. A transmission for connecting a driving shaft to a driven shaft comprising a hydraulic torque transmitting device having impeller and turbine members, means connecting the driving shaft to the impeller member, an intermediate shaft drivingly connected to the turbine member and having drivingly connected thereto a sun gear of a first planetary gear train and an annulus gear of a second planetary gear train, annulus and pinion gears drivingly connected with the sun gear of the first gear train, a carrier for the pinion gears of the first gear train, sun and pinion gears drivingly connected with the annulus gear of the second gear train, a carrier for the pinion gear of the second gear train, means drivingly connecting the annulus gear of the first gear train to the pinion gear carrier of the second gear train, an extension on said driving shaft concentrically arranged with respect to said intermediate shaft and having drivingly connected thereto a sun gear of a third planetary gear train, annulus and pinion gears drivingly connected with the sun gear of the third gear train, a carrier for the pinion gears of the third gear train, means drivingly connecting the carrier of the third gear train to the carrier of the second gear train and to the driven shaft, clutch means to drivingly connect the extension on said driving shaft with said driven shaft, braking means to selectively activate each of the gear trains, and speed and torque responsive control means to automatically and simultaneously operate said clutch means and the braking means for the second gear train.

6. A transmission for connecting a driving shaft to a driven shaft comprising a hydraulic torque transmitting device having impeller and turbine members, means connecting the driving shaft to the impeller member, an intermediate shaft drivingly connected to the turbine member and having drivingly connected thereto a sun gear of a first planetary gear train and an annulus gear of a second planetary gear train, annulus and pinion gears drivingly connected with the sun gear of the first gear train, a carrier for the pinion gears of the first gear train, sun and pinion gears drivingly connected with the annulus gear of the second gear train, a carrier for the pinion gears of the second gear train, means drivingly connecting the annulus gear of the first gear train to the pinion gear carrier of the second gear train, an extension on said driving shaft concentrically arranged with respect to said intermediate shaft and having drivingly connected thereto a sun gear of a third planetary gear train, annulus and pinion gears drivingly connected with the sun gear of the third gear train, a carrier for the pinion gears of the third gear train, means drivingly connecting the carrier of the third gear train to the carrier of the second gear train and to the driven shaft, braking means to selectively activate each of the gear trains, clutch means to drivingly connect the extension on said driving shaft with said driven shaft, speed and torque responsive control means to automatically control engagement and disengagement of said clutch means and the braking means for the second gear train, and manually operated control means to overrule the said speed and torque responsive control means.

7. A transmission for connecting a driving shaft to a driven shaft comprising a hydraulic torque transmitting device having impeller and turbine members, means connecting the driving shaft to the impeller member, an intermediate shaft drivingly connected to the turbine member and having drivingly connected thereto a sun gear of a first planetary gear train and an annulus gear of a second planetary gear train, annulus and pinion gears drivingly connected with the sun gear of the first gear train, a carrier for the pinion gears of the first gear train, sun and pinion gears drivingly connected with the annulus gear of the second gear train, a carrier for the pinion gears of the second gear train, means drivingly connecting the annulus gear of the first gear train to the pinion gear carrier of the second gear train, an extension on said driving shaft concentrically arranged with respect to said intermediate shaft, means drivingly connecting the pinion gear carrier of the second gear train to the driven shaft, means to selectively activate each of the gear trains, and clutch means to directly drivingly connect the extension of the driving shaft to the driven shaft.

8. A transmission for connecting a driving shaft to a driven shaft comprising a hydraulic torque transmitting device having impeller and turbine members, means connecting the driving shaft to the impeller member, an intermediate shaft drivingly connected to the turbine member and having drivingly connected thereto a sun gear of a first planetary gear train and an annulus gear of a second planetary gear train, annulus and pinion gears drivingly connected with the sun gear of the first gear train, a carrier for the pinion gears of the first gear train, sun and pinion gears drivingly connected with the annulus gear of the second gear train, a carrier for the pinion gears of the second gear train, means drivingly connecting the annulus gear of the first gear train to the pinion gear carrier of the second gear train, an extension on said driving shaft concentrically arranged with respect to said intermediate shaft, means drivingly connecting the pinion gear carrier of the second gear train to the driven shaft, means to selectively activate each of the gear trains, and clutch means to directly drivingly connect the etxension of the driving shaft to the driven shaft, and speed and torque responsive control means to automatically control engagement and disengagement of said clutch means and the braking means for the second gear train.

9. A transmission for connecting a driving shaft to a driven shaft comprising a hydraulic torque transmitting device having impeller and turbine members, means connecting the driving shaft to the impeller member, an intermediate shaft drivingly connected to the turbine member and having drivingly connected thereto a sun gear of a first planetary gear train and an annulus gear of a second planetary gear train, annulus and pinion gears drivingly connected with the sun gear of the first gear train, a carrier for the pinion gears of the first gear train, sun and pinion gears drivingly connected with the annulus gear of the second gear train, a carrier for the pinion gears of the second gear train, means drivingly connecting the annulus gear of the first gear train to the pinion gear carrier of the second gear train, an extension on said driving shaft concentrically arranged with respect to said intermediate shaft, means drivingly connecting the pinion gear carrier of the second gear train to the driven shaft, means to selectively activate each of the gear trains, and clutch means to directly drivingly connect the extension of the driving shaft to the driven shaft, and speed and torque responsive control means to automatically control engagement and disengagement of said clutch means and the braking means for the second gear train, and manually operated control means to overrule the said speed and torque responsive control means.

10. A transmission for connecting a driving shaft to a driven shaft comprising a hydraulic torque transmitting device having impeller and turbine members, means connecting the driving shaft to the impeller member, an intermediate shaft drivingly connected to the turbine member and having drivingly connected thereto a sun gear of a first planetary gear train and an annulus gear of a second planetary gear train, annulus and pinion gears drivingly connected with the sun gear of the first gear train, a carrier for the pinion gears of the first gear train, sun and pinion gears drivingly connected with the annulus gear of the second gear train, a carrier for the pinion gears of the second gear train, means drivingly connecting the annulus gear of the first gear train to the pinion gear carrier of the second gear train, an extension on said driving shaft concentrically arranged with respect to said intermediate shaft and having drivingly connected thereto a sun gear of a third planetary gear train, annulus and pinion gears drivingly connected with the sun gear of the third gear train, a carrier for the pinion gears of the third gear train, means drivingly connecting the carrier of the third gear train to the carrier of the second gear train and to the driven shaft, braking means to selectively activate each of the gear trains, and clutch means to directly drivingly connect the extension of the driving shaft to the driven shaft, a pressure fluid supply, conduit means including a control valve connecting said pressure fluid supply to the brake means for the second gear train and to the clutch means to provide means for the automatic actuation thereof, solenoid means to operate said control valve, and speed and torque responsive means to automatically control energization of said solenoid means.

11. A transmission for connecting a driving shaft to a driven shaft comprising a hydraulic torque transmitting device having a impeller and turbine members, means connecting the driving shaft to the impeller member, an intermediate shaft drivingly connected to the turbine member and having drivingly connected thereto a sun gear of a first planetary gear train and an annulus gear of a second planetary gear train, annulus and pinion gears drivingly connected with the sun gear of the first gear train, a carrier for the pinion gears of the first gear train, sun and pinion gears drivingly connected with the annulus gear of the second gear train, a carrier for the pinion gears of the second gear train, means drivingly connecting the annulus gear of the first gear train to the pinion gear carrier of the second gear train, an extension on said driving shaft concentrically arranged with respect to said intermediate shaft and having drivingly connected thereto a sun gear of a third planetary gear train, annulus and pinion gears drivingly connected with the sun gear of the third gear train, a carrier for the pinion gears of the third gear train, means drivingly connecting the carrier of the third gear train to the carrier of the second gear train and to the driven shaft, braking means to selectively activate each of the gear trains, and clutch means to directly drivingly connect the extension of the driving shaft to the driven shaft, a pressure fluid supply, conduit means including a control valve connecting said pressure fluid supply to the brake means for the second gear train and to the clutch means to provide means for the automatic actuation thereof, solenoid means to operate said control valve, and speed and torque responsive means to automatically control energization of said solenoid means, and manually controlled means to overrule said speed and torque responsive means to effect manual operation of said control valve.

12. A planetary type transmission unit comprising aligned input and output shafts, a hollow shaft concentrically mounted about said input shaft and having drivingly connected thereto the sun gear of a first planetary gear train and the annulus gear of a second planetary gear train, annulus and pinion gears drivingly connected to the sun gear of the first gear train, a pinion gear carrier rotatably supporting the pinion gears of the first gear train, sun and pinion gears drivingly connected to the annulus gear of the second gear train, a pinion gear carrier rotatably supporting the pinion gears of the second gear train, means drivingly connecting the annulus gear of the first gear train to the pinion gear carrier of the second gear train, means drivingly connecting the pinion gear carrier of the second gear train to the output shaft, braking means to selectively activate the several gear trains, and clutch means to directly drivingly connect the input and output shafts.

13. A planetary type transmission unit comprising aligned input and output shafts, a hollow shaft concentrically mounted about said input shaft and having drivingly connected thereto the sun gear of a first planetary gear train and the annulus gear of a second planetary gear train, annulus and pinion gears drivingly connected to the sun gear of the first gear train, a pinion gear carrier rotatably supporting the pinion gears of the first gear train, sun and pinion gears drivingly connected to the annulus gear of the second gear train, a pinion gear carrier rotatably supporting the pinion gears of the second gear train, means drivingly connecting the annulus gear of the first gear train to the pinion gear carrier of the second gear train, a sun gear for a third planetary gear train drivingly mounted on the input shaft, annulus and pinion gears drivingly connected to the sun gear of the third gear train, a pinion gear carrier rotatably supporting the pinion gears of the third gear train, means drivingly connecting the pinion gear carrier of the third gear train to the pinion gear carrier of the second gear train and to the output shaft, braking means to selectively activate the several gear trains, and clutch means to directly drivingly connect the input and output shafts.

14. In a hydrodynamic transmission, a casing within which are mounted in series relationship a hydraulic torque converter unit and a planetary type change speed gear unit, a driving shaft, an impeller wheel drivingly carried by said driving shaft, a coaxially arranged second shaft directly connected to said driving shaft, a first sun gear drivingly carried by said second shaft, a hollow shaft concentrically and rotatably mounted on said second shaft, a turbine wheel drivingly carried by said hollow shaft, an annular member drivingly connected to said hollow shaft mounting a second sun gear and a first annulus gear, a guide wheel disposed in operative relationship to said impeller and turbine wheels so as to provide a torque multiplying power transmitting fluid circuit, one-way brake means between said guide wheel and said casing adapted to prevent rotation of the guide wheel in the direction of its rotational tendency due to the reaction effect of the driving fluid set in motion by the impeller wheel, annulus and pinion gears of a first planetary gear train drivingly connected to said second sun gear, sun and pinion gears of a second planetary gear train drivingly connected to said first annulus gear, drive transmitting means connecting respectively the annulus and pinion gears of said first and second planetary gear trains, annulus and pinion gears of a third planetary gear train drivingly connected to said first sun gear, means drivingly connecting the pinion gearing of said second and third planetary gear trains, a driven shaft, means drivingly connecting said driven shaft to the pinion gearing of said third planetary gear train, brake means to selectively activate the planetary gear trains and clutch means adapted to connect said second shaft to said driven shaft.

15. In a power transmission comprising a rotor wheel torque converter unit and a planetary type change speed gear unit arranged in series, a casing, a driving shaft, an impeller wheel driven by said driving shaft, an intermediate shaft drivingly connected to said driving shaft, a first sun gear driven by said intermediate shaft, a hollow shaft rotatably and concentrically mounted on said intermediate shaft, a turbine wheel carried by said hollow shaft, an annular member drivingly connected to said hollow shaft mounting a second sun gear and a first annulus gear, a plurality of guide wheels disposed in operative relationship to said impeller and turbine wheels so as to provide a torque multiplying power transmitting fluid circuit, one-way brake means between said guide wheels and said casing for preventing rotation of the guide wheels in the direction of their rotational tendency due to the reaction effect of the driving fluid set in motion by the impeller wheel, annulus and pinion gears of a first planetary gear train drivingly connected to said second sun gear adapted to be activated to provide reverse drive means, sun and pinion gears of a second planetary gear train drivingly connected to said first annulus gear adapted to be activated to provide a starting forward underdrive means, drive transmitting means connecting respectively the annulus and pinion gears of said first and second planetary gear trains, annulus and pinion gears of a third planetary gear train connected to said first sun gear adapted to be activated to provide an emergency forward underdrive means and to serve as a coasting ratio, means connecting the pinion gears of said second and third planetary gear trains, means to selectively activate the planetary gear trains, a driven shaft, means connecting said driven shaft to the pinion gears of said third planetary gear train, and clutch means adapted to connect said intermediate shaft to said driven shaft for the transmission of direct drive from said driving shaft.

16. In a power transmission, a casing within which are mounted a hydraulic torque converter unit and a variable speed gear unit arranged in series relationship, said torque converter unit comprising a driving impeller member, a fluid driven turbine member, and a fluid reaction member; a first shaft drivingly connected to said impeller member and carrying a first sun gear, a second shaft drivingly connected to said turbine member and carrying an annular member provided with a second sun gear and a first annulus gear, annulus and pinion gearing of a first planetary gear train drivingly connected with said second sun gear, sun and pinion gearing of a second planetary gear train drivingly connected with said first annulus gear, means drivingly connecting the annulus gear of said first planetary unit to the planet pinion carrier of said second planetary gear trains, annulus and pinion gearing of a third planetary gear train drivingly connected with said first sun gear, means drivingly connecting the planet pinion carriers of the second and third planetary gear trains, an output shaft, means connecting the planet pinion carrier of said third gear train to said output shaft, braking means to selectively activate the planetary gear trains, and friction clutch means adapted to directly connect said first shaft to said output shaft.

17. In a power transmission for a motor vehicle having an input shaft and an output shaft; a casing, a hydraulic torque converter unit within said casing including an impeller wheel connected to said input shaft, a fluid operated turbine wheel drivingly connected to a third shaft and adapted to be driven by the fluid set in motion by said impeller wheel, said third shaft mounting a pair of gears, and a fluid operated guide wheel disposed in series relationship with said impeller and turbine wheels; means operable to automatically lock said guide wheel against reverse rotation, said means being releasable automatically in response to forward rotation of said guide wheel, planetary gearing providing a first and a second planetary gear train respectively, one gear train being connected to each of the pair of gears on said third shaft, means for drivingly connecting said first and second gear trains to said output shaft, means adapted to activate said first gear train to transmit a forward underspeed drive to said output shaft, means adapted to activate said second gear train to transmit a reverse drive to said output shaft, means adapted to directly connect said input and output shafts for the transmission of direct drive, torque and speed responsive means to automatically control the change in speed ratio between the forward underspeed drive and direct drive, and manually controlled means to overrule said torque and speed responsive means to provide for a kickdown from direct drive to the forward underspeed drive.

18. In a power transmission, an input shaft, a torque converter unit drivingly connected to said input shaft, a second shaft adapted to be driven by said converter unit, first and second planetary gear trains mounted on and arranged to be driven by said second shaft, an extension on said input shaft, a third planetary gear train mounted on and arranged to be drivingly connected to the extension on said input shaft, an output shaft, drive transmitting means for drivingly connecting each of said planetary gear trains to said output shaft, brake means adapted to activate said first gear train to transmit an accelerating forward underdrive to said output shaft, brake means adapted to activate said second gear train to transmit a reverse drive to said output shaft, brake means adapted to activate said third gear train to transmit a positive, forward, emergency underdrive to said output shaft and to provide a coasting ratio, clutch means adapted to directly drivingly connect said input and output shafts for the transmission of a forward direct drive, and speed and torque responsive control means adapted to effect automatic changes in the speed ratio drive between the accelerating underdrive and the direct drive.

19. In a power transmission, an input shaft, a torque converter unit drivingly connected to said input shaft, a second shaft adapted to be driven by said converter unit, first and second planetary gear trains mounted on and arranged to be driven by said second shaft, an extension on said input shaft, a third planetary gear train mounted on and arranged to be drivingly connected to the extension on said input shaft, an output shaft, means for drivingly connecting said planetary gear trains to said output shaft, brake means adapted to activate said first gear train to transmit an accelerating forward underdrive to said output shaft, brake means adapted to activate said second gear train to transmit a reverse drive to said output shaft, brake means adapted to activate said third gear train to transmit a positive, forward, emergency underdrive to said output shaft and to provide a coasting ratio, clutch means adapted to connect said input and output shafts for the transmission of a forward direct drive, speed and torque responsive control means adapted to effect automatic changes in the speed ratio drive between the accelerating forward underdrive and direct drive, and manually controlled means adapted to overrule said speed and torque responsive control means to effect a kickdown from the forward direct drive to the accelerating forward underdrive.

JOSEPH JANDASEK.

REFERENCES CITED

The following references are of record in the file of this patent:

UNITED STATES PATENTS

| Number | Name | Date |
|---|---|---|
| 1,132,390 | Royce | Mar. 16, 1915 |
| 1,955,455 | Ford | Apr. 17, 1934 |
| 2,146,369 | Dodge | Feb. 7, 1939 |
| 2,190,831 | Dodge | Feb. 20, 1940 |
| 2,322,479 | Schjolin | June 22, 1943 |
| 2,372,817 | Dodge | Apr. 3, 1945 |
| 2,397,303 | Osborne | Apr. 2, 1946 |
| 2,397,634 | Voytech | Apr. 2, 1946 |
| 2,418,378 | Voytech | Apr. 1, 1947 |
| 2,456,328 | Schneider | Dec. 14, 1948 |